(12) United States Patent
Kamada et al.

(10) Patent No.: US 7,631,114 B2
(45) Date of Patent: Dec. 8, 2009

(54) SERIAL COMMUNICATION DEVICE (75) Inventors: Kenji Kamada, Kodaira (JP); Yoichi Onodera, Asaka (JP); Yasumasa Suzuki, Iwaki (JP)

(73) Assignees: Renesas Technology Corp., Tokyo (JP); Alpine Electronics, Inc., Tokyo (JP)

( * ) Notice: Subject to any disclaimer, the term of this patent is extended or adjusted under 35 U.S.C. 154(b) by 298 days.

(21) Appl. No.: 10/808,287

(22) Filed: Mar. 25, 2004

(65) Prior Publication Data
US 2004/0193756 A1    Sep. 30, 2004

(30) Foreign Application Priority Data
Mar. 28, 2003    (JP)    ............ P2003-089559

(51) Int. Cl.
G06F 13/28    (2006.01)
(52) U.S. Cl. ............ 710/22; 710/23; 710/24; 710/25; 710/26; 710/27; 710/28; 710/48; 710/49; 710/50; 710/52; 710/57; 710/60; 710/260; 710/261; 710/262
(58) Field of Classification Search ............ 710/22–28, 710/48–50, 52, 57, 60, 260–262
See application file for complete search history.

(56) References Cited

U.S. PATENT DOCUMENTS

| | | | |
|---|---|---|---|
| 5,511,203 A | | 4/1996 | Wisor et al. |
| 6,687,796 B1 * | | 2/2004 | Laine et al. ............ 711/149 |
| 6,728,795 B1 * | | 4/2004 | Farazmandnia et al. ....... 710/22 |
| 2002/0026551 A1 | | 2/2002 | Kamimaki et al. |

FOREIGN PATENT DOCUMENTS

| | | |
|---|---|---|
| JP | 62-075857 A | 4/1987 |
| JP | 63-009256 A | 1/1988 |
| JP | 63-070665 A | 3/1988 |
| JP | 1-31249 A | 2/1989 |
| JP | 4-070947 A | 3/1992 |
| JP | 4-373059 A | 12/1992 |
| JP | 5-003498 A | 1/1993 |
| JP | 08314513 A | 5/1995 |
| JP | 7-302133 A | 11/1995 |
| JP | 11-39240 A | 2/1999 |
| JP | 11-85537 A | 3/1999 |
| JP | 11-134309 A | 5/1999 |
| JP | 2001-306489 A | 11/2001 |
| JP | 2001-331329 A | 11/2001 |
| JP | 2001-350713 A | 12/2001 |
| JP | 2002-229932 A | 8/2002 |

* cited by examiner

*Primary Examiner*—Fritz Fleming
*Assistant Examiner*—Chun-Kuan Lee
(74) *Attorney, Agent, or Firm*—Miles & Stockbridge P.C.

(57) ABSTRACT

The serial communication device capable of reducing the load on the CPU is provided for a system using the serial communications such as the car navigation system. The attention is focused on the control method of the serial communication, in which a DMA controller is used for the data reception in the serial communication, and a number larger than the number of data received at a time is set in advance as the number of transfers of the receive DMA controller, and further, the function to generate the timeout interrupt when data is not received for a certain period is added to the serial interface, so that the serial communication can be controlled and performed without applying the load on the CPU.

17 Claims, 7 Drawing Sheets

SERIAL COMMUNICATION DEVICE

CROSS-REFERENCE TO RELATED APPLICATION

The present application claims priority from Japanese Patent Application No. JP2003-89559 filed on Mar. 28, 2003, the content of which is hereby incorporated by reference into this application.

TECHNICAL FIELD OF THE INVENTION

The present invention relates to a serial communication device. More particularly, the present invention relates to a technique effectively applied to a system using much serial communications such as the car navigation system.

BACKGROUND OF THE INVENTION

For example, the technique examined by the inventors of the present invention in the field of a serial communication device such as the car navigation system is shown below.

More specifically, in the communication device in which the serial data is received and decided at the read timing of the predetermined number of times, the cycle of the communication process which determines this read timing is measured, and this read timing is hastened in order to prevent the case where the data cannot be decided when the read timing is delayed by the other interrupt process in the communication device (e.g., Japanese Patent Laid-Open No. 8-314513).

SUMMARY OF THE INVENTION

As a result of the examination for the technique of the serial communication device by the inventors of the present invention, the following is shown.

Since the read timing is changed after the detection of the process delay, the data reading is delayed. Also, since the basic processes are performed in a CPU (Central Processing Unit), the processes to change the timing are increased when there are many serial data reception processes, and as a result, the load on the CPU cannot be reduced.

Therefore, an object of the present invention is to provide the serial communication device capable of reducing the load on the CPU in a system using much serial communications such as the car navigation system.

The above and other objects and novel characteristics of the present invention will be apparent from the description and the accompanying drawings of this specification.

The typical ones of the inventions disclosed in this application will be briefly described as follows.

More specifically, in the serial communication device according to the present invention, the attention is focused on the method of controlling the serial communication, in which the DMA (Direct Memory Access) controller is used for the data reception in the serial communication, and a number larger than the number of data received at a time is set in advance as the number of transfers of the receive DMA controller (hereinafter, referred to as DMAC), and further, the function to generate the timeout interrupt when data is not received for a certain period is added to the serial interface (hereinafter, referred to as "SCIF"). By doing so, the serial communication can be controlled and performed without applying the load on the CPU. More details are as follows.

(1) In order to reduce the load on the CPU, the SCIF and the DMAC are used in the operation of the device.

(2) The receive DMAC is started up before the data reception.

(3) A number larger than the number of data received at a time is set in advance as the number of transfers of the receive DMAC. By doing so, the frequency to set the number of DMA transfers by the CPU can be reduced, and thus, the load on the CPU can be reduced.

(4) When the data-is received, as triggered by the receive FIFO data full DMA transfer request in the SCIF, the data is transferred from the receive FIFO (First-in First-out) to the DMA transfer buffer area (first memory).

(5) When a number of data equal to the number of DMA transfers is received, as triggered by the DMA transfer end interrupt, the received data (data having transferred to the DMA transfer buffer area) is transferred to the work area (second memory) in which the application or the driver can be used.

(6) When the data is not received for a certain period before the data equal to the number of DMA transfers is received, as triggered by the timeout interrupt, the received data (data having transferred to the DMA transfer buffer area) is transferred to the work area (second memory) in which the application or the driver can be used.

(7) In addition, the DMAC with a continuous transfer function is used as the DMAC for receiving, and the DMA transfer buffer area is divided into two or more areas to alternately switch the destinations of the DMA transfer. By doing so, it is possible to prevent the receiving error of the serial receive data.

BRIEF DESCRIPTIONS OF THE DRAWINGS

FIG. 1 is a diagram showing the system configuration including the serial communication device and the flow of the data reception process according to the first embodiment of the present invention, in which

DESCRIPTION OF THE PREFERRED EMBODIMENTS

Hereinafter, embodiments of the present invention will be described in detail with reference to the accompanying drawings. Note that components having the same function are denoted by the same reference symbols throughout the drawings for describing the embodiment, and the repetitive description thereof is omitted.

First Embodiment

Figure 1A:
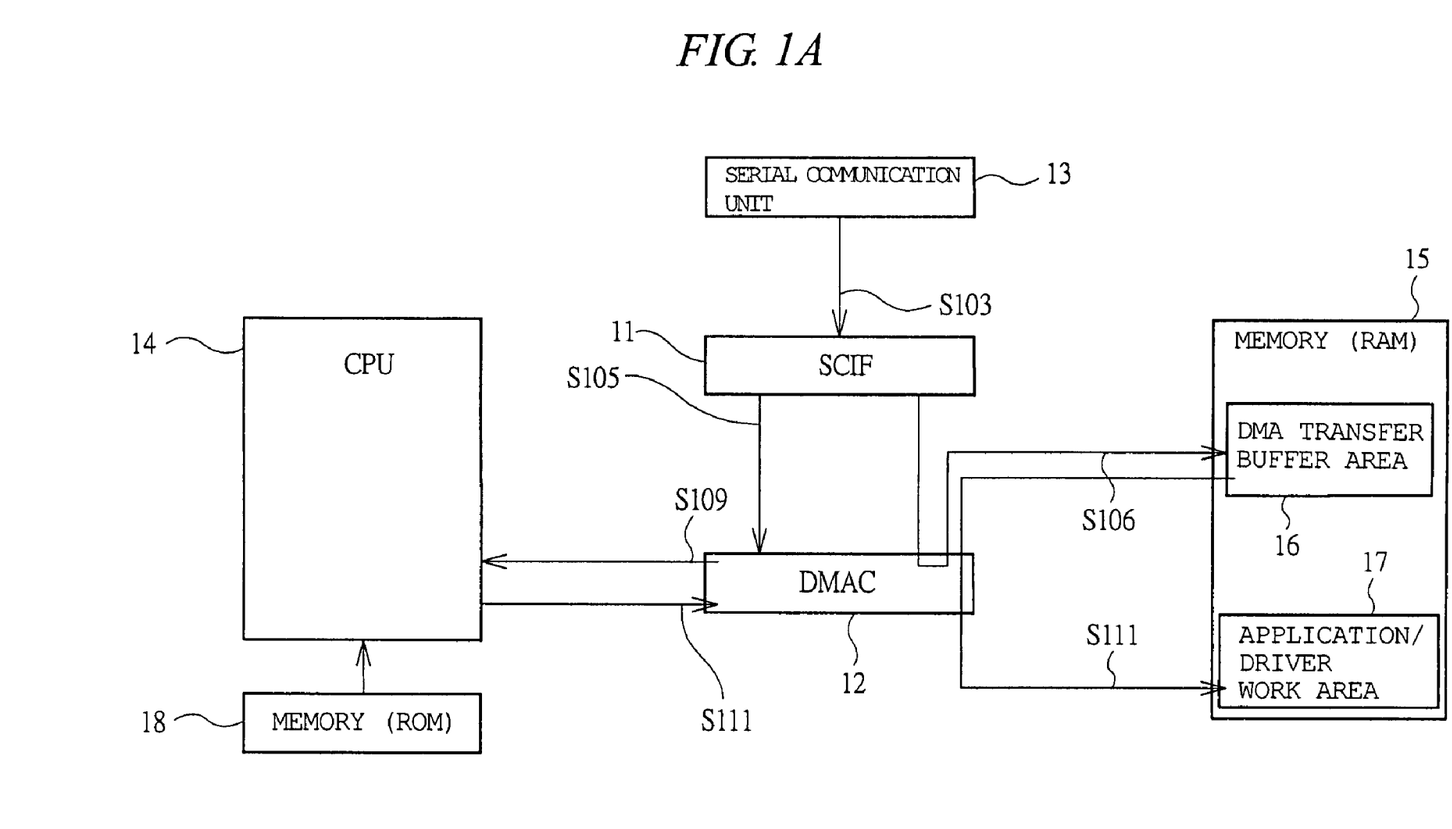
FIG. 1A shows the case where a predetermined number of DMA transfers are finished before the data reception is stopped and FIG. 1B shows the case where the data reception is stopped during the DMA transfer.
Figure 1B:
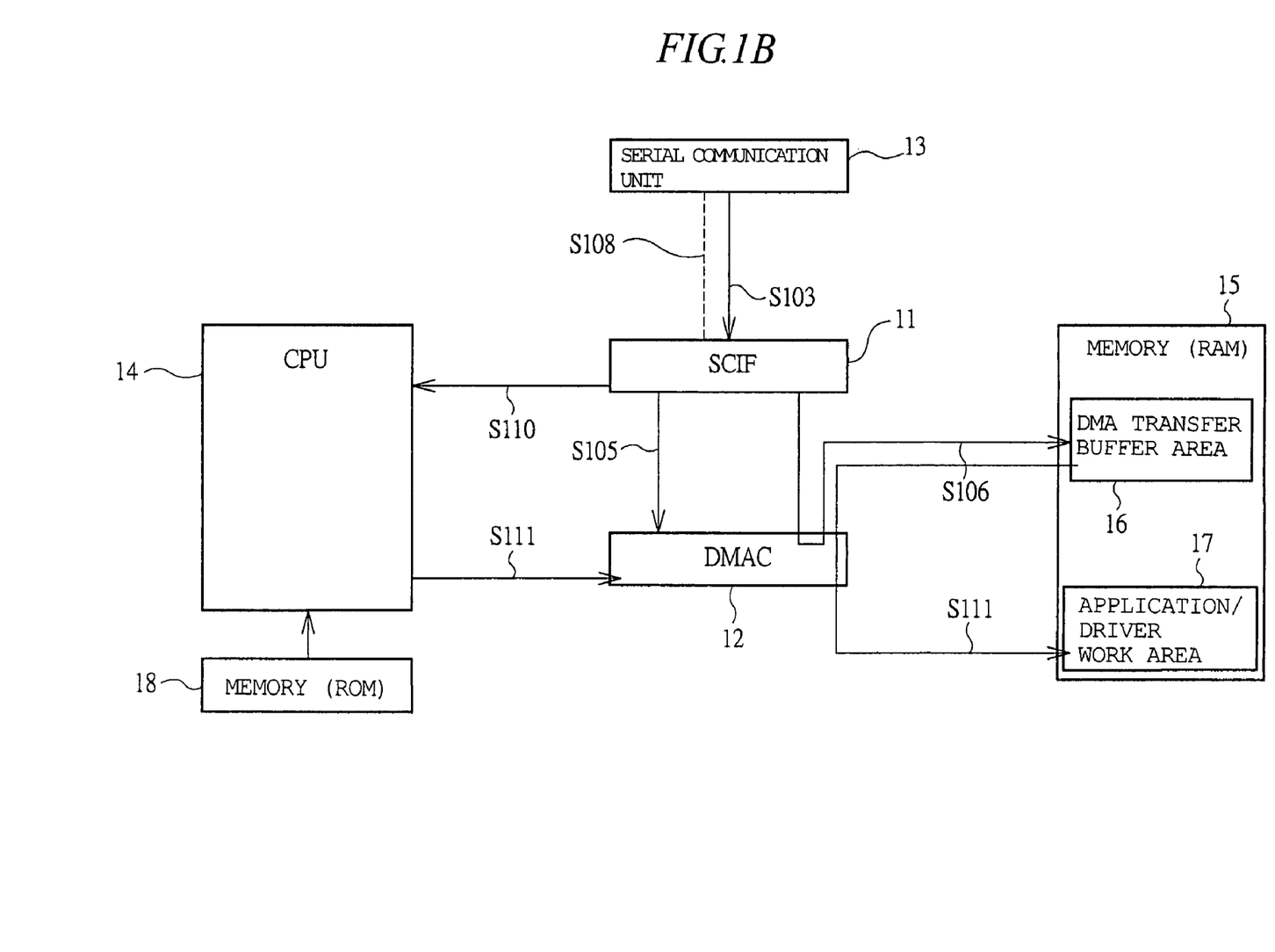
Figure 2:
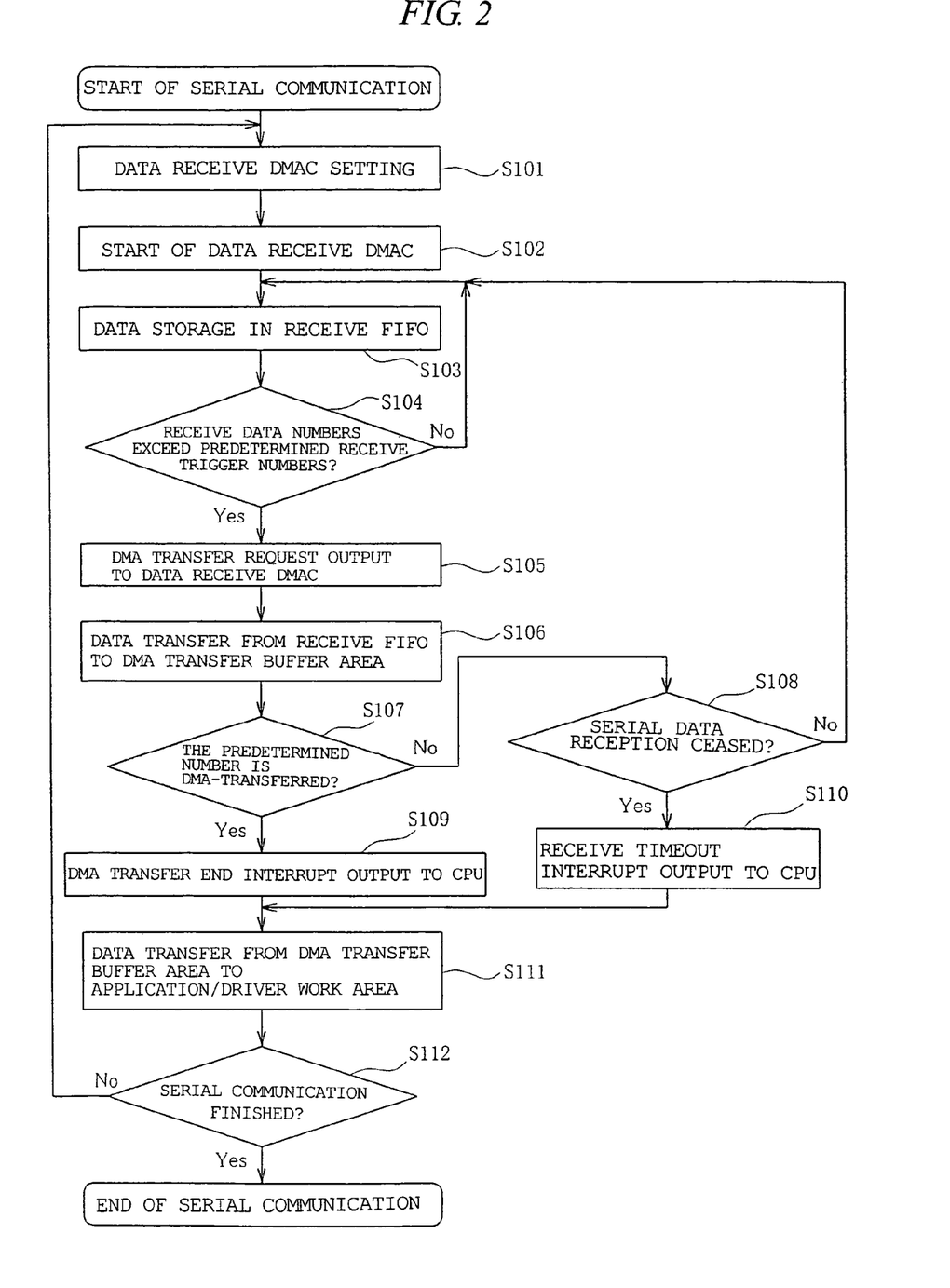
FIG. 2 is a flow chart showing the flow of the data reception process in the serial communication according to the first embodiment of the present invention.
Figure 3:
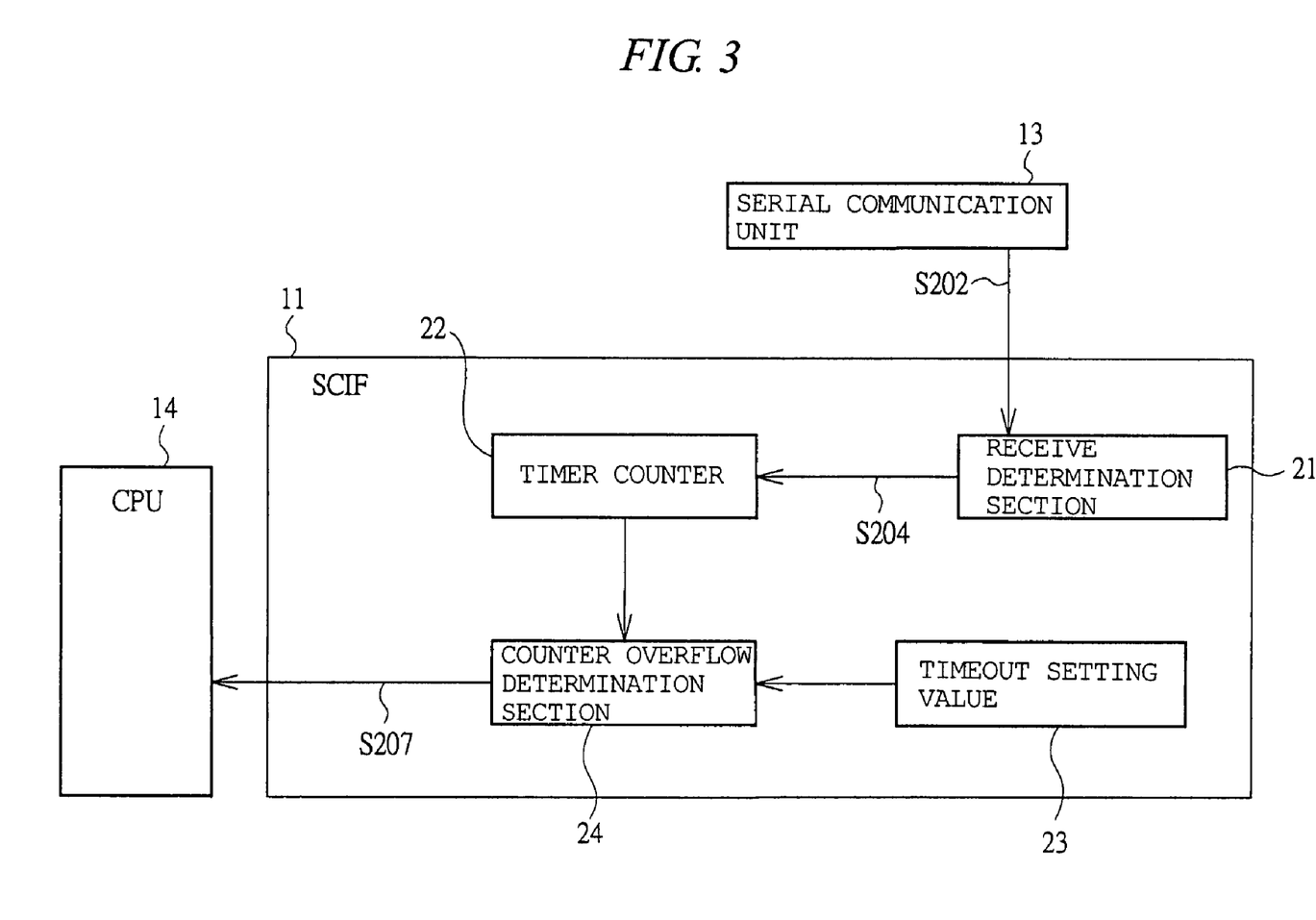
FIG. 3 is a diagram showing the configuration of the receive timeout interrupt signal generation unit in the SCIF and the process flow according to the first embodiment of the present invention.
Figure 4:
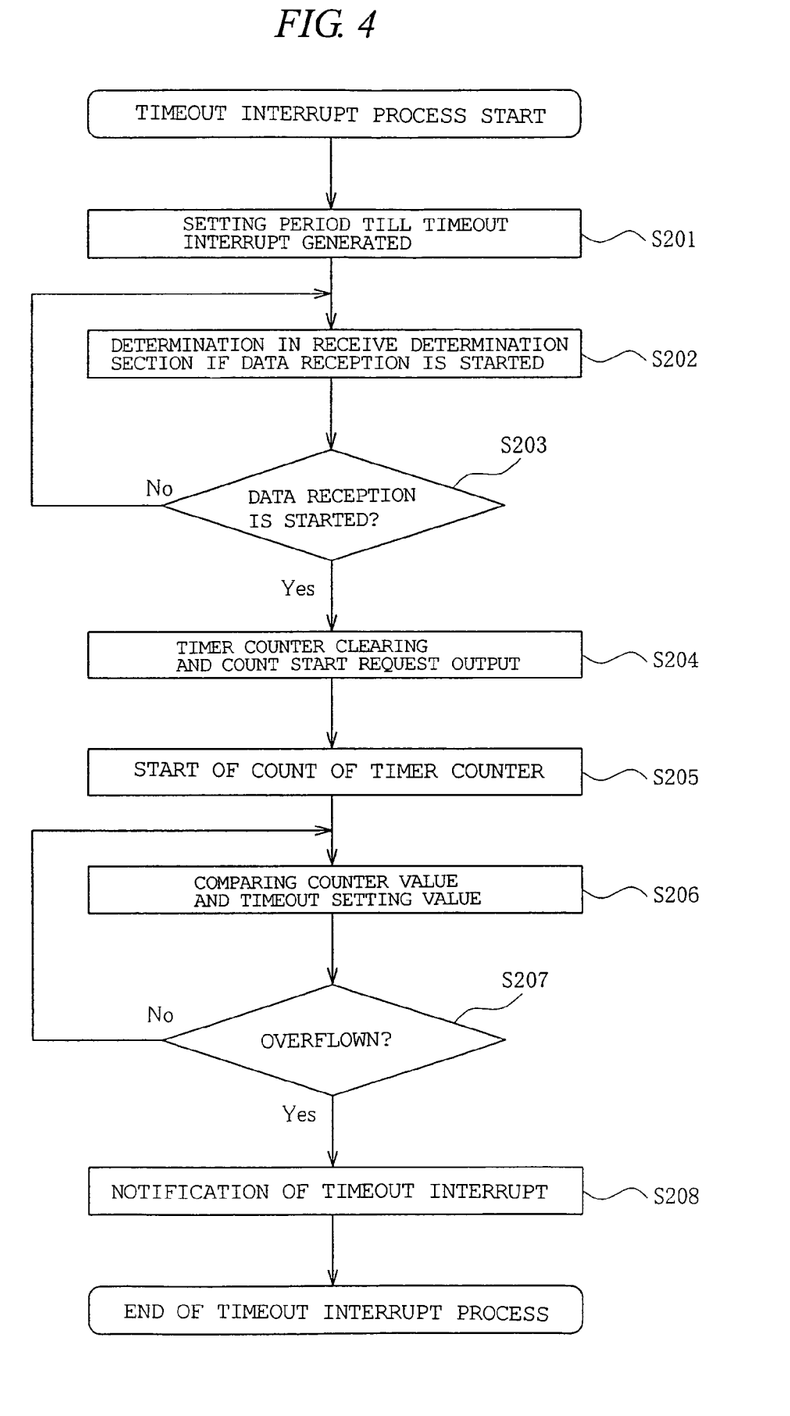
FIG. 4 is a flow chart showing the process flow in the receive timeout interrupt signal generation unit in the SCIF according to the first embodiment of the present invention.

FIG. 1 is a diagram showing the system configuration including the serial communication device and the flow of the data reception process according to the first embodiment of the present invention, in which FIG. 1A shows the case where a predetermined number of DMA transfers are finished before the data reception is stopped and FIG. 1B shows the case where the data reception is stopped during the DMA transfer. FIG. 2 is a diagram showing the flow of the data reception process in the serial communication according to the first embodiment. FIG. 3 is a diagram showing the configuration of the receive timeout interrupt signal generation unit in the SCIF and the process flow according to the first embodiment, and FIG. 4 shows the process flow in the receive timeout interrupt signal generation unit.

First, an example of the configuration of the serial communication device according to the first embodiment will be described with reference to FIGS. 1A and 1B. The serial communication device according to the first embodiment is comprised of, for example, a SCIF 11, a DMAC 12, and the like and these components are connected to each other. Also, the SCIF 11 is connected to the external serial communication unit 13 and receives the serial data. The SCIF 11 and the DMAC 12 are connected to the CPU 14 and the memory 15 via the bus and the interrupt signal line to configure the system.

The SCIF 11 is the interface to provide the serial communication with the external serial communication unit 13 and includes the receive FIFO (not shown) and the receive timeout interrupt signal generation unit (not shown). The receive FIFO is the First-In First-Out buffer memory in which the serial data from the serial communication unit 13 is temporarily stored. The receive timeout interrupt signal generation unit will be described in detail with reference to FIGS. 3 and 4.

The DMAC 12 is a controller to control the data transfer (DMA transfer) between the SCIF 11 and the memory 15 and in the memory 15 instead of the CPU 14.

The CPU 14 is the central processing unit to perform the computing and the control of the system.

The memory 15 is the writable, readable, and erasable memory and includes the DMA transfer buffer area 16 (first memory) and the application/driver work area 17 (second memory). The DMA transfer buffer area 16 is the buffer area in the memory in which the data transferred from the SCIF 11 is temporarily stored. The application/driver work area 17 is the work area in the memory in which programs such as the application and the driver can be used.

The memory 18 is the read only memory and includes such programs as the application and the driver run by the CPU 14 and the data.

Next, the flow of the data reception process in the serial communication in the serial communication device according to the first embodiment will be described with reference to FIGS. 1A, 1B and 2.

In this first embodiment, the DMAC 12 is used for the data transfer of the received data in the serial communication from the receive FIFO to the memory 15.

A number larger than the number of data received at a time is set in advance as the number of transfers of the DMAC for receiving 12 (STEP S101). It is preferable that the number of transfers is set as large as possible. By doing so, it is possible to reduce the frequency to set the number of DMA transfers by the CPU 14, and thus, it is possible to reduce the process performed by the CPU 14. The access size of the data to be transferred, the destination address, the source address, the trigger to start/stop the transfer, and whether or not the interrupt signal is noticed are set in addition to the number of transfers.

The DMAC for receiving 12 is started up before the data reception, and the DMAC for receiving 12 is set to the waiting mode for the data transfer trigger (STEP S102).

The data received by the serial communication is stored in the receive FIFO in the SCIF 11 (STEP S103).

When the number of data received in the receive FIFO exceeds the predetermined number of receive trigger, the receive FIFO data full DMA transfer request is outputted from the SCIF 11 to the data receive DMAC 12 (STEPs S104 and S105). The predetermined number of receive trigger is set in the SCIF 11 at the initialization before the start of the serial communication.

As triggered by the DMA transfer request, the received data is DMA-transferred by the DMAC 12 from the receive FIFO to the DMA transfer buffer area 16 in the memory 15 (STEP S106).

In the case where a number of data smaller than the predetermined number of DMA transfers is DMA-transferred but the data reception is continued, the process returns to the STEP S103 (STEPs S107 and S108).

When a number of data equal to the predetermined number of DMA transfers is DMA-transferred, the DMA transfer end interrupt is outputted from the DMAC 12 to the CPU 14 (STEPs S107 and S109 in FIG. 1A).

When the number of data equal to the predetermined number of DMA transfers is DMA-transferred and the data reception is stopped for a certain period, the receive timeout interrupt is outputted from the SCIF 11 to the CPU 14 (STEPs S108 and S110 in FIG. 1B). In order to prevent the continuous output of the receive timeout interrupt signal, the means to stop the generation of the receive timeout interrupt until the next data reception after the receive timeout interrupt has been once generated, is provided. In addition, the means to stop the generation of the receive timeout interrupt when some kind of errors occur in the serial communication is provided. Furthermore, the means capable of selecting whether the receive timeout interrupt is generated or not when some kind of errors is occurring in the serial communication is provided.

In the case where there is no function provided to determine and notify the receive timeout, it is necessary to perform the polling of the receive FIFO of the SCIF 11 by the CPU 14 so as to confirm whether the data reception has ceased or not. Accordingly, the processes performed by the CPU 14 are increased. The process flow to generate the receive timeout interrupt signal will be described later with reference to FIGS. 3 and 4.

As triggered by the end of the DMA transfer or by the receive timeout interrupt, the data transferred to the DMA transfer buffer area 16 is transferred to the application/driver work area 17 (STEP S111).

In the case where the serial communication is to be continued, the process returns to the STEP S101 (STEP S112).

Next, an example of the configuration of the receive timeout interrupt signal generation portion in the SCIF 11 in the serial communication device according to the first embodiment will be described with reference to FIG. 3.

The receive timeout interrupt signal generation portion is comprised of, a receive determination section 21, a timer counter 22, a timeout setting value 23, a counter overflow determination section 24, and the like. The receive determination section 21 receives the receive data signal (RXD) from the external serial communication unit 13 and outputs the count start trigger to the timer counter 22. The timer counter 22 outputs the value of the counter to the counter overflow determination section 24, and the timeout setting value 23 outputs the setting value of the timeout to the counter overflow determination section 24. The counter overflow determination section 24 outputs the receive timeout interrupt signal to the CPU 14 when the timer counter is overflown.

Next, the process flow of the generation of the receive timeout interrupt signal will be described with reference to FIGS. 3 and 4.

The timeout setting value 23 is set in advance for the time period until the receive timeout interrupt is generated (STEP S201). A register for setting this time period is required if it is desired to make this time period variable. It is possible to write the setting value in this setting register, or the setting value can be a fixed value.

When the data is received, whether the reception is started or not is determined in the receive determination section 21 (STEPs S202 and S203). This determination is made at each data reception.

When the data reception is started, the signal of the count start request is outputted from the receive determination section 21 to the timer counter 22 (STEP S204). When this signal is inputted, the value of the timer counter 22 is cleared, and the count is newly started from zero (STEP S205).

The counter value and the timeout setting value are compared in the counter overflow determination section 24 (STEPs S206 and S207).

When the counter value exceeds the timeout setting value, the receive timeout interrupt signal is outputted from the counter overflow determination section 24 to the CPU 14 (STEP S208)

Second Embodiment

Figure 5:
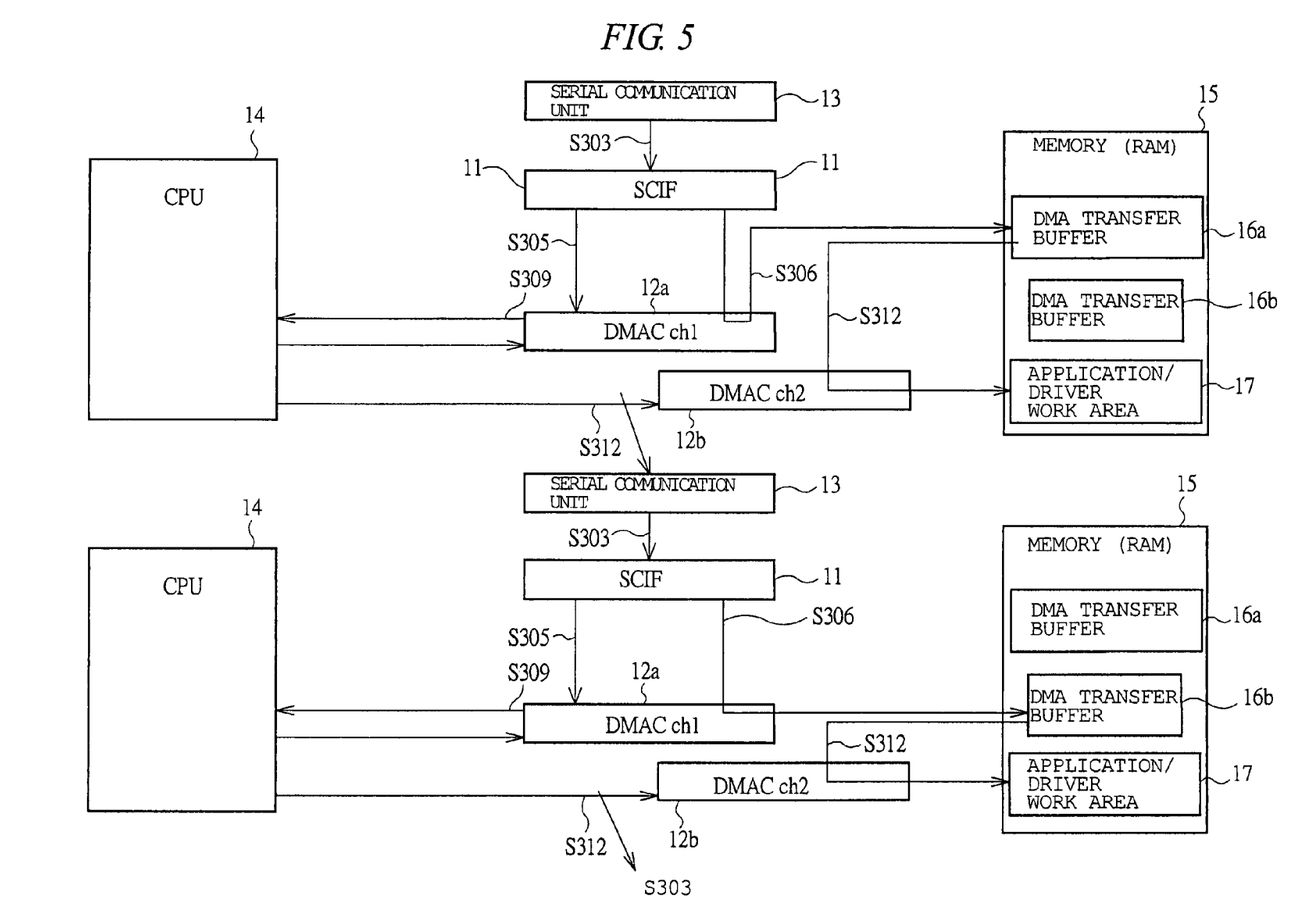
FIG. 5 is a diagram showing the system configuration including the serial communication device and the flow of the data reception process according to the second embodiment of the present invention, which shows the case where a predetermined number of DMA transfers are finished before the data reception is stopped and the case where the data reception is stopped during the DMA transfer.
Figure 6:
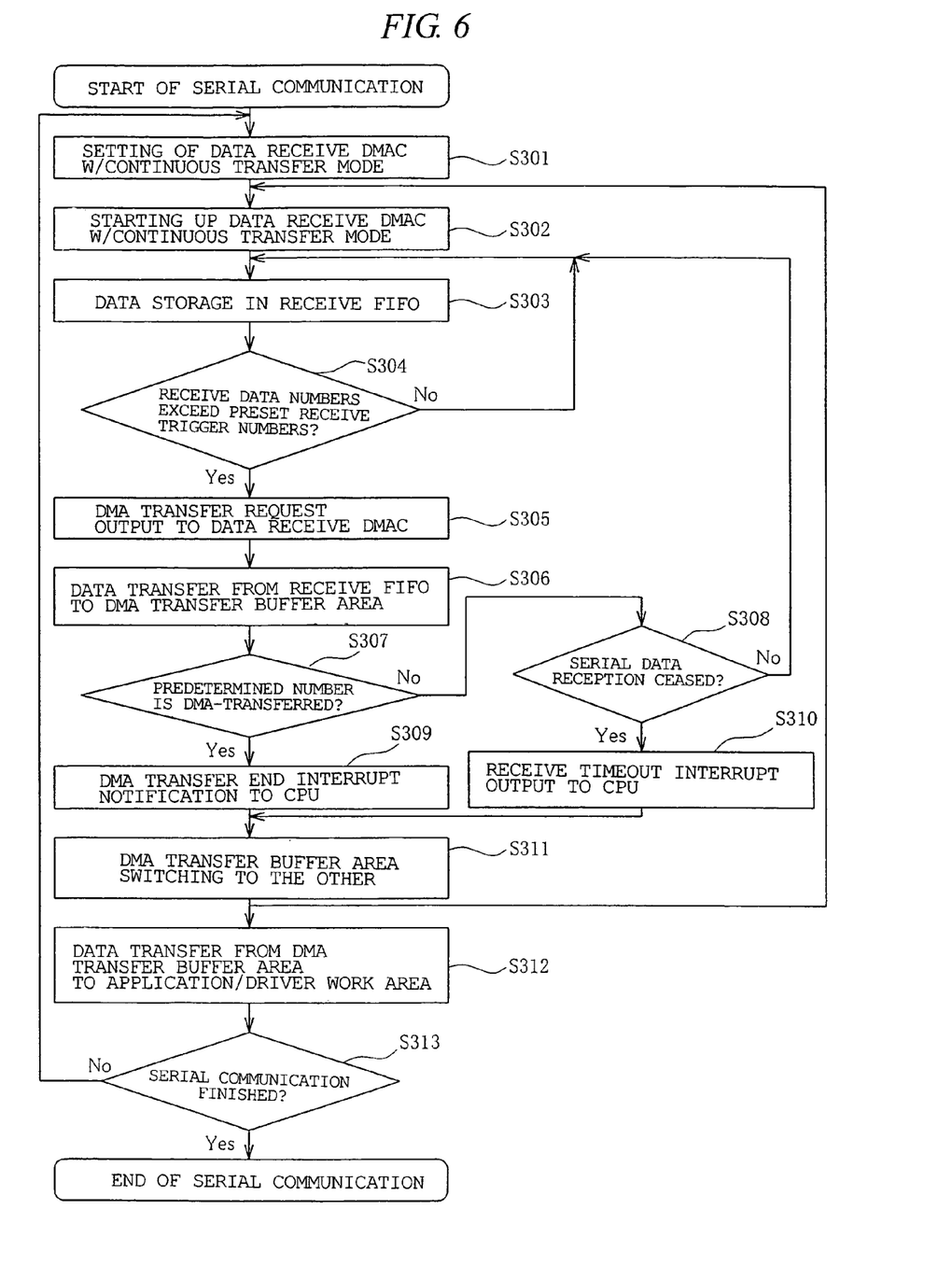
FIG. 6 is a flow chart showing the flow of the data reception process in the serial communication according to the second embodiment of the present invention.

FIG. 5 is a diagram showing the system configuration including the serial communication device and the flow of the data reception process according to the second embodiment of the present invention, which shows the case where a predetermined number of DMA transfers are finished before the data reception is stopped. FIG. 6 is a diagram showing the flow of the data reception process in the serial communication according to the second embodiment, which shows the case where a predetermined number of DMA transfers are finished before the data reception is stopped and the case where the data reception is stopped during the DMA transfer.

In the serial communication device according to the second embodiment, the DMAC with the continuous transfer mode is used in the data transfer as the DMAC 12 described in the first embodiment. The DMAC with the continuous transfer mode transfers the data to the two areas of DMA transfer buffers 16a and 16b alternately in the DMA transfer buffer area 16 in the first embodiment. When the transferred data fills the one area of the DMA transfer buffer, the DMA transfer end interrupt is outputted to the CPU 14, and the destination of the data transfer is switched to the other area of the DMA transfer buffer. Therefore, it is possible to continue the DMA transfer.

Next, the flow of the data reception process in the serial communication by the serial communication device according to the second embodiment will be described with reference to FIGS. 5 and 6.

In this second embodiment, two channels of DMAC 12a and 12b are used for the transfer of the data received in the serial communication from the receive FIFO to the memory 15.

As the number of transfers of the DMAC 12a with the continuous transfer mode, a number larger than the number of data received at a time is set in advance (STEP S301). By doing so, it is possible to reduce the frequency to set the number of DMA transfers by the CPU 14, and thus, it is possible to reduce the process performed by the CPU 14. In this case, it is preferable that the number of transfers is set as large as possible. Also, the two areas of DMA transfer buffers 16a and 16b are set as the transfer destinations.

The DMAC for receiving 12a and 12b are started up before the data reception, and the DMAC for receiving 12a and 12b are set to be the wait mode for the data transfer trigger (STEP S302).

The data is received by the serial communication and the data is stored in the receive FIFO (STEP S303).

When the number of data received in the receive FIFO exceeds the predetermined number of receive trigger, the receive FIFO data full DMA transfer request signal is outputted from the SCIF 11 to the data receive DMAC 12a (STEPs S304 and S305).

As triggered by the DMA transfer request, the receive data is DMA-transferred by the DMAC 12a from the receive FIFO to the area of the DMA transfer buffer 16a in the memory 15 (STEP S306).

When a number of data smaller than the predetermined number of DMA transfers is DMA transferred to the DMA transfer buffer 16a and the data reception is continued, the process returns to the STEP S303 (STEPs S307 and S308).

When a number of data equal to the predetermined number of DMA transfers is DMA-transferred to the DMA transfer buffer 16a, the DMA transfer end interrupt is outputted from the DMAC 12a to the CPU 14 (STEPs S307 and S309). At this time, the DMA transfer is stopped but the serial data reception may still be continued.

In the case where the number of data smaller than the predetermined number of DMA transfers had been DMA-transferred but the data reception has been ceased for a certain period, the receive timeout interrupt is outputted from the SCIF 11 to the CPU 14 (STEPs S308 and S310). In order to prevent the continuous output of the receive timeout interrupt signal, the means to stop the generation of the receive timeout interrupt until the next data reception after the receive timeout interrupt has been once generated, is provided.

As triggered by the end of the DMA transfer or by the receive timeout interrupt, the destination of the data transfer is switched to the other area of DMA transfer buffer 16b and the DMAC 12a is started up (STEPs S311 and S302 in the bottom side of FIG. 5). The DMA transfer can be continuously performed by switching the destination of the data transfer to the other area of the DMA transfer buffer. By restarting the DMA transfer in a short time by using the continuous transfer mode, it becomes possible to prevent the receiving error of the serial receive data, which may occur during the period from the process resulting from the generation of the interrupt to the start of the next DMA transfer.

As triggered by the end of the DMA transfer or by the receive timeout interrupt, the serial receive data transferred to either of the DMA transfer buffer 16a or the other area of the DMA transfer buffer 16b is transferred to the application/driver work area 17 in which the application or the driver can be used (STEP S312). The DMAC 12b is used in this transfer, which is the different channel from the DMAC 12a used in the transfer of the serial receive data.

In the case where the serial communication is to be continued, the process returns to the STEP S301 (STEP S313).

As described above, in the serial communication device according to the second embodiment, the receive data is transferred while alternately switching the two DMA transfer buffers 16a and 16b. Therefore, it is possible to prevent the receiving error of the serial receive data, which may occur during the period from the process resulting from the generation of the interrupt to the start of the next DMA transfer.

In the foregoing, the invention made by the inventors of the present invention has been concretely described based on the embodiments. However, it is needless to say that the present invention is not limited to the foregoing embodiments and various modifications and alterations can be made within the scope of the present invention.

For example, a system using the serial communications such as the car navigation system has been described in the above-described embodiments. However, the present invention is not limited to this, and it is also possible to apply the present invention to the other system using the serial communications.

The effect obtained by the typical ones of the inventions disclosed in this application will be briefly described as follows.

(1) The data reception in the serial communication is performed in the DMA controller instead of the CPU and the frequency to set the number of transfers of the DMA controller by the CPU is reduced. Therefore, the load on the CPU can be reduced.

(2) Since the load on the CPU in the data reception in the serial communication can be reduced, the malfunction of the system due to the excessive load on the CPU can be prevented even if the number of channels of the serial communication interface is increased.

(3) Since the timeout interrupt is generated when the data reception in the serial communication is stopped and the data transfer is not performed, it is possible to surely take the received data.

(4) Since the condition to generate timeout interrupt is set, it is possible to prevent the unnecessary generation of the timeout interrupt, and thus, it is possible to reduce the load on the CPU.

What is claimed is:

1. A serial communication device, comprising:
a central processing unit to execute a program;
a serial communication interface coupled to receive data from outside the serial communication device and to provide a transfer request signal and a timeout interrupt signal, the timeout interrupt signal being provided to the central processing unit when the data from outside the serial communication device is not received by the serial communication interface for a predetermined time;
a RAM including:
a buffer area to store the data, and
a work area for the program; and
a direct memory access controller coupled to receive the transfer request signal and to transfer the data from the serial communication interface to the buffer area, the direct memory access controller having set therein a first number as a number of transfers, the first number being greater than a second number corresponding to a number of data received at a time by the serial communication interface,
wherein the direct memory access controller provides a data transfer end interrupt signal to the central processing unit when a transfer number of data received by the serial communication interface reaches the first number, and
wherein any data stored in the buffer area is transferred to the work area by the direct memory access controller when the central processing unit receives the data transfer end interrupt signal or the timeout interrupt signal.

2. A serial communication device according to claim 1,
wherein the serial communication interlace includes a first-in first-out memory to store the data from outside the serial communication device, and
wherein the transfer request signal is provided to the direct memory access controller when a number of data received in the first-in first-out memory exceeds a number of data received trigger set in the serial communication interface.

3. A serial communication device according to claim 1,
wherein the direct memory access controller is started up before the serial communication interface receives the data iron outside the serial communication device, and
wherein the first number is set in the direct memory access controller before the serial communication interface receives the data.

4. A serial communication device according to claim 3, wherein the serial communication interface further includes means for stopping the generation of data to be received by the serial communication interface from outside the serial communication device after the time out interrupt signal has been generated.

5. A serial communication device comprising:
a central processing unit to execute a program;
a serial communication interface coupled to receive data from outside the serial communication device and to provide a transfer request signal, the serial communication interface including a timeout interrupt signal generation section to provide a timeout interrupt signal to the central processing unit based on a timeout setting value for a period until the timeout interrupt signal is generated;
a memory including:
a buffer area to store the data; and
a work area for the program; and
a direct memory access controller coupled to receive the transfer recues signal and to transfer the data from the serial communication interface to the buffer area, the direct memory access controller having set therein a first number as a number of transfers, the first number being greater than a second number corresponding to a number of data received at a time by the serial communication interface,
wherein the direct memory access controller provides a data transfer end interrupt signal to the central processing unit when a number of data transferred from the serial communication interface to the buffer area by the direct memory access controller reaches the first number, and
wherein any data stored in the buffer area is transferred to the work area by the direct memory access controller when the central processing unit receives one of the data transfer end interrupt signal and the timeout interrupt signal.

6. A serial communication device according to claim 5, wherein the timeout interrupt signal generation section includes:
a receive determination section coupled to receive the data from outside the serial communication device and to provide a count start trigger when the data is received;

a counter coupled to receive the count start trigger and to provide a count value; and an overflow determination section coupled to receive the count value and the timeout setting value and to provide the timeout interrupt signal when the count value exceeds the timeout setting value.

7. A serial communication device according to claim 6, wherein the timeout interrupt signal generation section further includes a register to store the timeout setting value.

8. A serial communication device according to claim 7, herein the serial communication interface is configured to stop generation of the timeout interrupt signal until next data is received by the serial communication interface, after the timeout interrupt signal has been provided.

9. A serial communication device according to claim 5,
wherein the serial communication interface includes a first-in first-out memory to store the data from outside the serial communication device, and
wherein the transfer request signal is provided to the direct memory access controller when a number of data received in the first-in first-out memory exceeds a number of data received trigger set in the serial communication interface.

10. A serial communication device according to claim 5,
wherein the direct memory access controller is started up before the serial communication interface receives the data from outside the serial communication device, and
wherein the first number is set in the direct memory access controller before the serial communication interface receives the data.

11. A serial communication device comprising:
a central processing unit to execute a program;
a serial communication interface coupled to receive data from outside the serial communication device and to provide a transfer request signal, the serial communication interface including a timeout interrupt signal generation section to provide a timeout interrupt signal to the central processing unit based on a timeout value for a time period. until the timeout interrupt signal is generated;
a memory including:
a first buffer area, and
a second buffer area, and
a work area for the program; and
a direct memory access controller having a continuous transfer function and coupled to receive the transfer request signal and to transfer the data from the serial communication interface to one of the first buffer area and the second buffer area; the direct memory access controller providing a data transfer end interrupt signal to the central processing unit and changing a destination of a data transfer to the other of the first buffer area and the second buffer area,
wherein any data stored In the one of the first buffer area and the second buffer area is transferred to the work area by the direct memory access controller when the central processing unit receives one of the data transfer end interrupt signal and the timeout interrupt signal.

12. A serial communication device according to claim 11,
wherein the serial communication interface includes a first-in first-out memory to store the data from outside the serial communication device, and
wherein the transfer request signal is provided to the direct memory access controller when a number of data received in the first-in first-out memory exceeds a number of data received trigger set in the serial communication interface.

13. A serial communication device according to claim 11,
wherein the direct memory access controller is started no before the serial communication interface receives the data from outside the serial communication device, and
wherein the first number is set in the direct memory access controller before the serial communication interface receives the data.

14. A serial communication device according to claim 11,
wherein the timeout interrupt signal generation section includes:
a receive determination section coupled to receive the data from outside the serial communication device and to provide a count start trigger when determining reception of the data by the serial communication interface;
a counter to provide a count value, the counter being responsive to the count start trigger starting the counter's count up operation; and
an overflow determination section to compare the count value with the timeout setting value and to provide the timeout interrupt signal based on a result of the comparison being that the count value has exceeded the timeout setting value.

15. A serial communication device according to claim 14, wherein the timeout interrupt signal generation section further includes a register to store the timeout setting value.

16. A serial communication device according to claim 14,
wherein the direct memory access controller has a first channel and a second channel,
wherein one of the first channel and the second channel is used for eta transfer from the serial communication unit to one of the first buffer area and the second buffer area, while the other one of the first channel arid the second channel is used for a data transfer from the other one of the first buffer area and the second buffer area to the work area.

17. A serial communication device according to claim 11, wherein the serial communication interface is configured to stop the generation of the timeout interrupt signal until the serial communication interface receives next data, after the timeout interrupt signal is provided.

* * * * *